June 12, 1956  E. J. DILLMAN  2,749,926
MANUALLY RESETTABLE PRESSURE OPERATED VALVE
Filed July 3, 1952  2 Sheets-Sheet 1

INVENTOR.
EARNEST J. DILLMAN
BY
Andrew K. Foulds
ATTORNEY

June 12, 1956 — E. J. DILLMAN — 2,749,926
MANUALLY RESETTABLE PRESSURE OPERATED VALVE
Filed July 3, 1952 — 2 Sheets-Sheet 2

INVENTOR.
EARNEST J. DILLMAN
BY
Andrew K. Fouldo
ATTORNEY

United States Patent Office 2,749,926
Patented June 12, 1956

2,749,926

MANUALLY RESETTABLE PRESSURE OPERATED VALVE

Earnest J. Dillman, Detroit, Mich., assignor to Detroit Controls Corporation, a corporation of Michigan Application July 3, 1952, Serial No. 297,121

9 Claims. (Cl. 137—73)

This invention relates to new and useful improvements in automatic valves and more particularly to a pressure operated manually resettable valve for use as a safety device in a gas supply line.

One of the objects of this invention is to provide an automatically operated safety valve which is extremely sensitive in the conditions to which it responds.

Another object is to provide a pressure operated safety valve of the manually resettable type which is operable to respond to a very small change in pressure at the condition of response.

Another object is to provide a pressure operated manually resettable safety valve which includes a temperature responsive means for effecting a safety operation of the valve upon the occurrence of a predetermined temperature.

Another object is to provide a pressure operated safety valve which is simple and inexpensive to assemble and which is easy to operate.

Other objects will become apparent from time to time throughout the specification and claims as hereinafter related.

This invention comprises the new and useful construction and combination of parts and their operating relation one to another which will be described more fully hereinafter and the novelty of which will be particularly pointed out and distinctly claimed.

Figure 1:
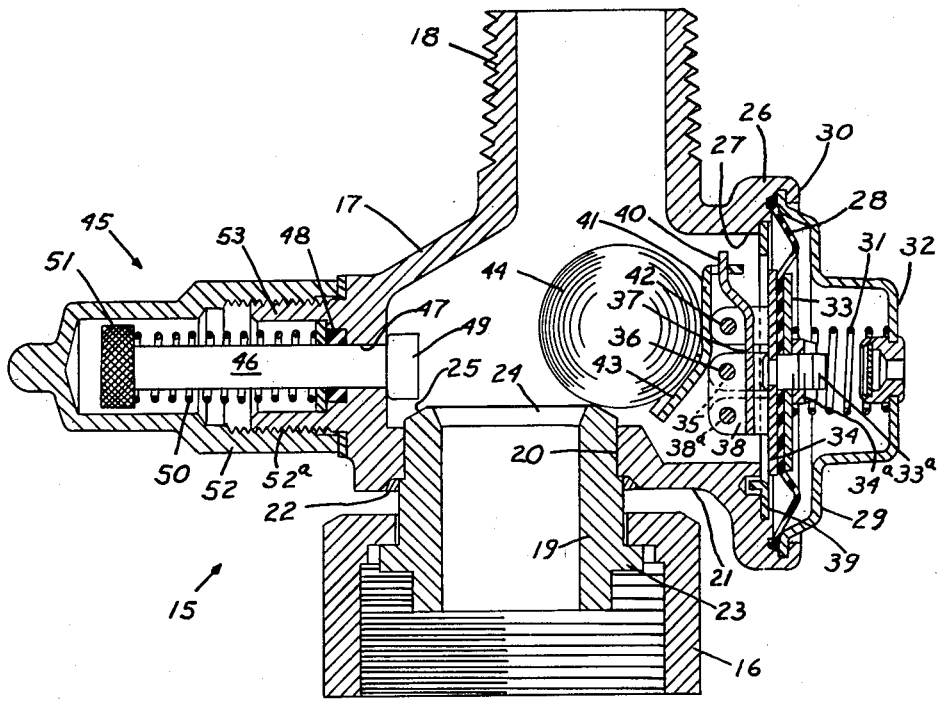
Figure 2:
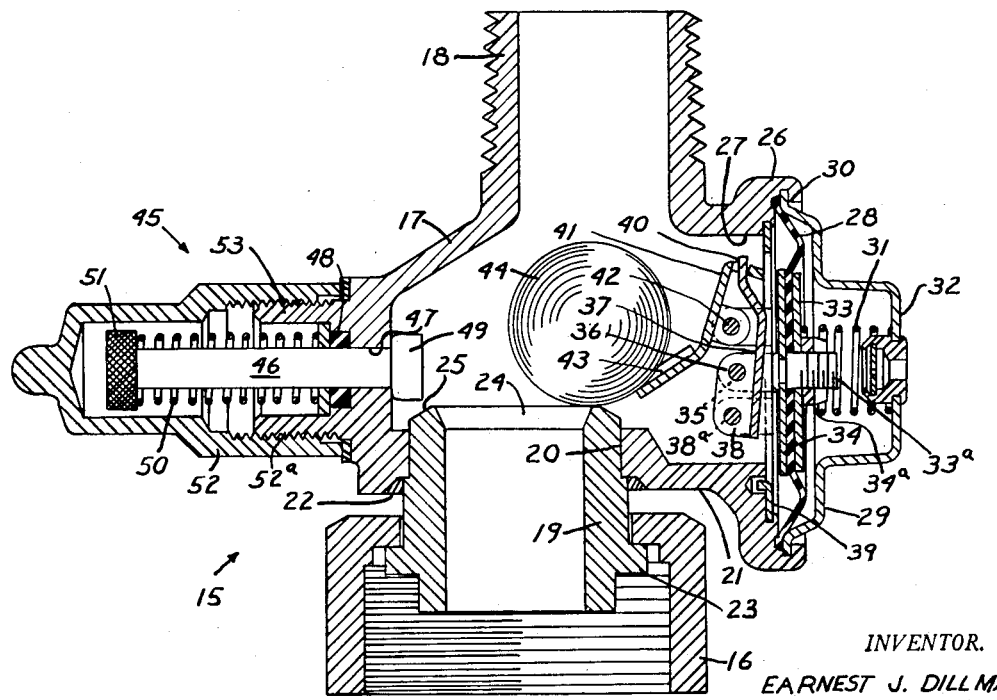
Figure 3:
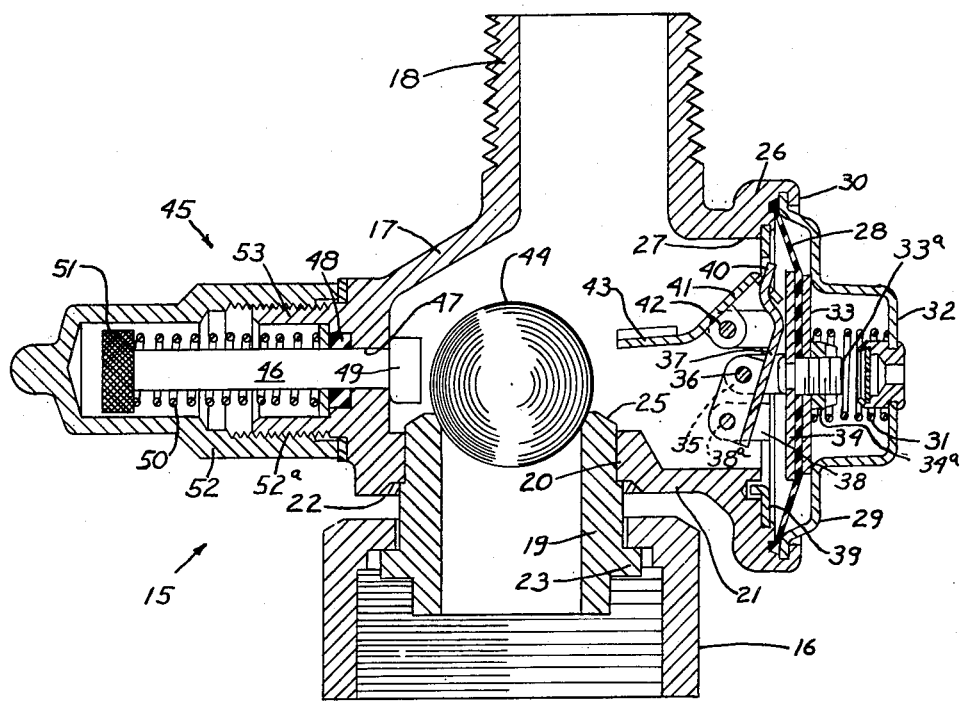
Figure 4:
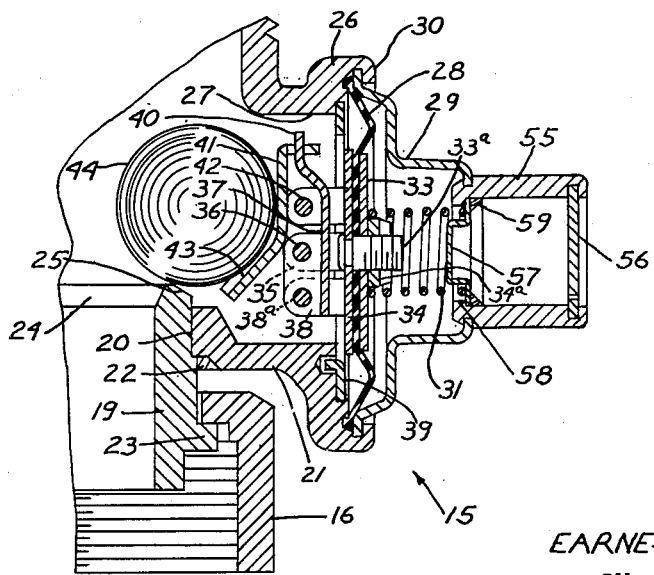

In the accompanying drawings, to be taken as a part of this specification, there are clearly and fully illustrated two preferred embodiments of this invention, in which drawings:

Figure 1 is a view taken in longitudinal central section of a pressure operated safety valve which is the subject of this invention, Fig. 2 is a view similar to Fig. 1 and showing the valve in a partially operated position, Fig. 3 is a view similar to Figs. 1 and 2 and showing the valve in a fully operated position, and Fig. 4 is a detail sectional view of a portion of a valve similar to Figs. 1 to 3, inclusive, but showing a modified form in which there is provided a temperature responsive means for valve actuation.

Referring to the drawings by characters of reference and more particularly to Fig. 1, there is shown a valve 15 comprising a casing 17 having a male-threaded tubular inlet portion 18 in the upper wall thereof and having a tubular outlet portion 19 in the lower wall thereof. The tubular outlet portion 19 comprises a separate member which is inserted through an aperture 20 in the bottom wall 21 of the casing 17 and is welded or brazed in position as indicated at 22. The member 19 has an annular rib 23 at its lower end portion which retains in position a female-threaded unit type fitting 16. The inlet and outlet connections are laterally offset to provide a valve which is interchangeable with a swivel offset nipple. The upper end or rim portion of the member 19 extends a short distance within the casing 17 and has an inner bevelled valve seat portion 24 formed thereon and a bevelled outer edge portion as indicated at 25. The casing 17 has an enlarged side portion 26 having an enlarged opening 27 therein which opens laterally into the passage extending from the inlet 18 to the outlet 19. The opening 27 is closed by a diaphragm 28 which is sealed at its periphery by a cup-shaped cover member 29 which is held in position by an inturned rim 30 on the enlarged casing portion 26. The diaphragm 28 is urged inward by a spring 31 which is positioned between the end wall 32 of the cup-shaped member 29 and a supporting plate 33 secured on the diaphragm 28. On the inner side of the diaphragm 28 there is secured a plate member 34 which is fastened to the plate 33 by a stud 33ª and nut 34ª. The plate member 34 has one or more laterally projecting fingers 35 thereon which are pivotally connected as at 36 to a third-class lever 37. The lever 37 has a fulcrum 38 on a lateral projection 38ª from a plate member 39 and is connected at its free end 40 for movement of a first-class lever 41. The lever 41 has a fulcrum member 42 and has a bent operating end portion 43. A spherical or ball-shaped valve member 44 is positioned between the outer bevelled edge 25 of the rim end of valve seat member 19 and the bent end portion 43 of the lever 41. On the opposite side of the casing 17 from the valve member 44 there is provided a reset mechanism 45. The reset mechanism 45 comprises a laterally movable plunger 46 which is reciprocally guided in an aperture 47 in the side wall of the casing 17 and which is provided with suitable packing 48 to prevent leakage therethrough. The plunger 46 has a head portion 49 which is engageable with the valve 44 for resetting the same from a closed position. The plunger 46 is normally held in a non-operating position by a spring 50 which engages the outer head portion 51 of the plunger. The cap member 52 is positioned in enclosing relation to the plunger 46 and is threadedly connected as at 52ª to a lateral projection 53 on the casing 17 to prevent operation of the plunger inadvertently.

In operation, the valve 15 functions as a very sensitive pressure operated valve which is operable to be closed upon a very small change in pressure of the medium passing through it. This valve is designed particularly for use in gas supply systems to shut off the flow of gas upon occurrence of an excessive pressure due to failure of the pressure regulating equipment. In its installation the valve would normally be positioned in a gas line in series with and just ahead of the gas meter. The diaphragm 28 is movable in response to pressure of the gas flowing through the valve. The pressure to which the diaphragm 28 responds is determined by the spring 31. Movement of the diaphragm 28 in response to pressure in the valve is effected through a compound leverage comprising the levers 37 and 41 which magnify the movement of this diaphragm. The lever 41 has its bent end portion 43 engageable with the lower surface of the spherical valve member 44 and is operable upon movement to pivot the valve member 44 over the inner rim portion of the valve seat member 19 for engagement with the valve seat surface 24. It should be noted that the center of gravity of the valve member 44 is positioned sufficiently outward from the rim of the valve seat member 19 so that the valve member is not easily dislodged and closed by small shocks or by vibration. It should also be noted that since the bent end portion 43 of the lever 41 engages the valve member 44 at a point on the extreme lower surface thereof, there is required only a very small amount of movement of the lever 41 to pivot the valve member 44 over the valve seat rim to closed position. In Fig. 2, the valve is shown moved to a position just prior to closing. In this view it becomes apparent that only a very small movement of the lever 41 and an even smaller movement of the diaphragm 28 is required for actuation of this valve. In Fig. 3, the valve is shown in the position assumed when completely closed and the diaphragm 28 is moved to its maximum outward position engaging the cover member 29 when there is a high pressure within the valve casing. The head portion 49 of the reset plunger 46 is engageable with the valve member 44 (as is apparent from Fig. 3) at a point low enough on the valve member that it may be rolled out of its closed position back to its initial position by actuation of the reset member. When the pressure within the valve casing is reduced by correction of whatever failure of equipment may have occurred, the valve member may be moved by the reset plunger 46 back over the valve rim to its normal open position resting between the valve seat rim and the operating lever 41.

In the valve which is shown in Fig. 4, the construction is sufficiently identical with that shown in the other figures that all corresponding parts are given the same reference characters as in the preceding figures. In this valve, the end wall 32 of the cup-shaped cover member 29 is replaced by a cylindrical member 55. The member 55 has an outer fixed end wall 56 and has an inner fixed end wall 57 which supports the inner end of the spring 31 in the same manner as did the end wall 32 in the preceding figures. The end wall 57 in this valve, however, is positioned against an inturned shoulder 58 in the cylindrical member 55 and is held in position by a fusible solder 59.

The operation of this valve is identical with that shown in the preceding figures so far as its response to pressure is concerned. However, the fusible solder 59, which supports in position the end wall 57, is operable as a thermostatic means to render the valve operable at lower operating pressures. This thermostatic means is operable upon fusion to permit the supporting wall 57 to move outward and release the compressive force exerted by the spring 31 so that the diaphragm 28 will be actuated by the normal pressures in the valve rather than requiring the predetermined excessive pressure determined by the normal setting of the spring 31. This arrangement is provided particularly so that when this valve is used to control gas flow it will shut off the supply of gas upon occurrence of a predetermined high temperature such as might be caused by a fire in the immediate vicinity of the valve. It is apparent then that in this form of valve there is provided an automatic valve closing means which is effective upon occurrence of a predetermined excesesive pressure due to failure of pressure regulating equipment or upon occurrence of a predetermined excessive temperature such as may be caused by a fire.

Although there have been shown only two embodiments of this invention, it will be obvious to those skilled in the art that other embodiments of this invention would be possible without departing from the scope and intent of this invention which should be limited only by the claims appended hereto.

Having thus described the invention, what is claimed and is desired to be secured by Letters Patent of the United States is:

1. A pressure operated safety valve comprising a valve casing having an inlet and an outlet, a valve seat in said casing, a spherical valve member in said casing normally positioned laterally from said valve seat in an open position, an abutment restraining said valve member from lateral movement toward closed position, a lever positioned for engagement with the lower surface of said valve member, and pressure responsive means operatively connected to said lever for moving the same, said pressure responsive means being operable at a predetermined pressure in said casing to move said lever to engage said valve member along the lower surface thereof to cause said valve member to pivot over said abutment into closed position against said valve seat.

2. A valve as defined in claim 1 wherein the inlet and outlet are laterally offset to provide connections interchangeable with a swivel offset nipple.

3. A pressure operated safety valve comprising a valve casing having an inlet and an outlet, a valve seat in said casing, a spherical valve member in said casing normally positioned laterally from said valve seat in an open position, an abutment restraining said valve member from lateral movement toward closed position, a lever positioned for engagement with the lower surface of said valve member, a diaphragm positioned for response to pressure in said casing and operatively connected to said lever for moving the same, a spring cooperable with said diaphragm and determining the pressure of response thereof, and said diaphragm being operable at a predetermined pressure in said casing to move said lever to engage said valve member along the lower surface thereof to cause said valve member to pivot over said abutment into closed position against said valve seat.

4. A pressure operated safety valve comprising a valve casing having an inlet and an outlet, a valve seat member having an inwardly extending rim and a valve seat surface, a lever pivotally mounted in said casing and spaced laterally from said valve seat, a pressure responsive diaphragm positioned for response to pressure in said casing and operatively connected to said lever for moving the same, a spherical valve member normally positioned in open position and supported between said valve seat rim and said lever, said lever being engageable with the lower surface of said valve member, and said diaphragm being operable at a predetermined pressure to move said lever to pivot said valve member over said valve seat rim to closed position against said valve seat surface.

5. A pressure operated safety valve comprising a valve casing having an inlet and an outlet, a valve seat member having an inwardly extending rim and a valve seat surface, a lever pivotally mounted in said casing and spaced laterally from said valve seat, a pressure responsive diaphragm positioned for response to pressure in said casing and operatively connected to said lever for moving the same, a spherical valve member normally positioned in open position and supported between said valve seat rim and said lever, said lever being engageable with the lower surface of said valve member, said diaphragm being operable at a predetermined pressure to move said lever to pivot said valve member over said valve seat rim to closed position against said valve seat surface, and a laterally movable reset plunger engageable with said valve member to move the same from closed to open position after actuation by said pressure responsive diaphragm.

6. A pressure operated safety valve comprising a valve casing having a tubular projection defining an inlet in the upper wall thereof, the lower wall of said casing having an outlet aperture therein, a tubular outlet member secured and sealed in said outlet aperture and extending into said casing, the inner end of said tubular member having outer and inner bevelled surfaces defining a rim and a valve seat, said casing having an enlarged opening in the side wall thereof spaced laterally from said valve seat, a diaphragm closing said side wall opening and having its periphery sealed against the casing wall, a cup-shaped cover member covering said diaphragm and having its outer periphery seated against the periphery of said diaphragm, an inturned flange on said casing side wall securing said cover member and diaphragm in position, a supporting member secured in said opening, a lever pivotally mounted on said supporting member and operatively connected to said diaphragm for actuation thereby, a spherical valve member normally supported in an open position between said lever and said rim, said lever being engageable with said valve member along the lower surface thereof, said diaphragm being operable at a predetermined pressure to move said lever to engage the lower surface of said valve member to pivot the same over said rim to closed position against said valve seat, the side wall of said casing opposite said diaphragm having an aperture therein, a reset plunger slidably positioned in said aperture and movable to engage said valve member to move the same from a closed position to said normally open position after actuation by said diaphragm, and a spring engaging said plunger and holding the same normally in a non-operated position laterally spaced from said valve seat.

7. A safety valve comprising a valve casing having an inlet and an outlet, a valve seat in said casing, a spherical valve member in said casing normally positioned laterally from said valve seat in an open position, an abutment restraining said valve member from lateral movement toward closed position, a lever positioned for engagement with the lower surface of said valve member, and pressure responsive means operatively connected to said lever for moving the same, said pressure responsive means being operable at a predetermined pressure in said casing to move said lever to engage said valve member along the lower surface thereof to cause said valve member to pivot over said abutment into closed position against said valve seat, and thermostatic means cooperable with said pressure responsive means and operable at a predetermined temperature to render said pressure responsive means operable at a lower predetermined pressure.

8. A safety valve comprising a valve casing having an inlet and an outlet, a valve seat in said casing, a spherical valve member in said casing normally positioned laterally from said valve seat in an open position, an abutment restraining said valve member from lateral movement toward closed position, a lever positioned for engagement with the lower surface of said valve member, a diaphragm positioned for response to pressure in said casing and operatively connected to said lever for moving the same, a spring cooperable with said diaphragm and determining the pressure of response thereof, and said diaphragm being operable at a predetermined pressure in said casing to move said lever to engage said valve member along the lower surface thereof to cause said valve member to pivot over said abutment into closed position against said valve seat, a fusible support for said spring, and said support being operable at a predetermined temperature to release said spring so that said diaphragm may be actuated by a predetermined lower pressure.

9. A safety valve comprising a valve casing having a tubular projection defining an inlet in the upper wall thereof, the lower wall of said casing having an outlet aperture therein, a tubular outlet member secured and sealed in said outlet aperture and extending into said casing, the inner end of said tubular member having outer and inner bevelled surfaces defining a rim and a valve seat, said casing having an enlarged opening in the side wall thereof spaced laterally from said valve seat, a diaphragm closing said side wall opening and having its periphery sealed against the casing wall, a cup-shaped cover member covering said diaphragm and having its outer periphery seated against the periphery of said diaphragm, an inturned flange on said casing side wall securing said cover member and diaphragm in position, a supporting member secured in said opening, a lever pivotally mounted on said supporting member and operatively connected to said diaphragm for actuation thereby, a spring operatively positioned between said diaphragm and said cover member and determining the pressure of response of said diaphragm, a spherical valve member normally supported in an open position between said lever and said rim, said lever being engageable with said valve member along the lower surface thereof, said diaphragm being operable at a predetermined pressure to move said lever to engage the lower surface of said valve member to pivot the same over said rim to closed position against said valve seat, a fusible support for said spring in said cover member, said fusible support being operable at a predetermined temperature to release said spring so that said diaphragm may be actuated by a predetermined lower pressure, the side wall of said casing opposite said diaphragm having an aperture therein, a reset plunger slidably positioned in said aperture and movable to engage said valve member to move the same from a closed position to said normally open position after actuation by said diaphragm, and a spring engaging said plunger and holding the same normally in a non-operated position laterally spaced from said valve seat.

References Cited in the file of this patent

UNITED STATES PATENTS

| 679,687 | Simpson | July 30, 1901 |
| 819,492 | Wylie | May 1, 1906 |
| 1,863,155 | Finney | June 14, 1932 |
| 2,271,786 | Watkins | Feb. 3, 1942 |
| 2,635,626 | Meynig | Apr. 21, 1953 |
| 2,667,890 | Meynig | Feb. 2, 1954 |

FOREIGN PATENTS

| 10,737 | Great Britain | of 1885 |
| 1,624 | Great Britain | Jan. 21, 1911 |
| 18,555 | Great Britain | of 1913 |
| 418,275 | Italy | Feb. 11, 1947 |